United States Patent
Byun et al.

(10) Patent No.: US 9,929,397 B2
(45) Date of Patent: Mar. 27, 2018

(54) RECHARGEABLE BATTERY HAVING FUSE

(71) Applicant: SAMSUNG SDI CO., LTD., Yongin-si, Gyeonggi-do (KR)

(72) Inventors: Sang-Won Byun, Yongin-si (KR); Won-Jun Lee, Yongin-si (KR); Hong-Hyeon Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 123 days.

(21) Appl. No.: 14/706,912

(22) Filed: May 7, 2015

(65) Prior Publication Data
US 2016/0043381 A1 Feb. 11, 2016

(30) Foreign Application Priority Data
Aug. 8, 2014 (KR) .......... 10-2014-0102614

(51) Int. Cl.
*H01M 2/00* (2006.01)
*H01M 2/34* (2006.01)
*H01M 10/04* (2006.01)

(52) U.S. Cl.
CPC .......... *H01M 2/348* (2013.01); *H01M 2/345* (2013.01); *H01M 10/0431* (2013.01); *H01M 2200/103* (2013.01); *H01M 2200/20* (2013.01)

(58) Field of Classification Search
CPC ... H01M 2/348; H01M 2/345; H01M 10/0431
See application file for complete search history.

(56) References Cited

U.S. PATENT DOCUMENTS

| | | | | |
|---|---|---|---|---|
| 5,939,217 A | * | 8/1999 | Tamura | H01M 2/1241 429/53 |
| 7,786,641 B2 | | 8/2010 | Nishijima | |
| 2011/0081560 A1 | * | 4/2011 | Kim | H01H 37/761 429/7 |
| 2011/0183165 A1 | * | 7/2011 | Byun | H01M 2/0202 429/61 |
| 2011/0244281 A1 | * | 10/2011 | Byun | H01M 2/22 429/62 |
| 2011/0300419 A1 | * | 12/2011 | Byun | H01M 2/22 429/61 |

FOREIGN PATENT DOCUMENTS

| | | |
|---|---|---|
| JP | 2013-099193 A | 5/2013 |
| KR | 10-2007-0116020 A | 12/2007 |
| KR | 10-2007-0118438 A | 12/2007 |
| KR | 10-2012-0047542 A | 5/2012 |

OTHER PUBLICATIONS

English machine translation of Japanese Publication No. JP 2013-099193 A, dated May 20, 2013, 21 pages.

* cited by examiner

*Primary Examiner* — Jimmy Vo
(74) *Attorney, Agent, or Firm* — Lewis Roca Rothgerber Christie LLP (57) ABSTRACT

A rechargeable battery includes: an electrode assembly including a first electrode and a second electrode; a case for accommodating the electrode assembly; a first current collector coupled to the first electrode and including a fuse; and a second current collector coupled to the second electrode. First and second blocking members are positioned on the first current collector at a distance from each other with the fuse 10 interposed inbetween and each blocking member includes a nonconductor.

14 Claims, 9 Drawing Sheets

RECHARGEABLE BATTERY HAVING FUSE

CROSS-REFERENCE TO RELATED APPLICATION

This application claims priority to and the benefit of Korean Patent Application No. 10-2014-0102614 filed in the Korean Intellectual Property Office on Aug. 8, 2014, the entire content of which is incorporated herein by reference.

BACKGROUND

1. Field

Aspects of the present invention relate to a rechargeable battery, and more particularly, to a rechargeable battery having a fuse.

2. Description of the Related Art

A rechargeable battery differs from a primary battery in that it can be repeatedly charged and discharged, while the latter is not designed to be recharged.

A low-capacity rechargeable battery is used in small portable electronic devices such as mobile phones, notebook computers, and camcorders, while a high-capacity rechargeable battery can be used as a power source for driving a motor of a hybrid vehicle or the like.

Recently, a high power rechargeable battery using a non-aqueous electrolyte and having a high energy density has been developed, and the high power rechargeable battery is formed as a large-capacity rechargeable battery in which a plurality of rechargeable batteries are connected in series, such that it can be used as a power source for driving a motor of a device requiring a large amount of electric power, for example, an electric vehicle or the like.

In addition, a high-capacity rechargeable battery generally includes a plurality of rechargeable batteries connected in series, and the rechargeable battery may have a cylindrical shape, a prismatic shape, etc.

The rechargeable battery may have a case made of metal, etc. When the internal pressure of the rechargeable battery is increased by an abnormal reaction, the rechargeable battery may explode or catch fire.

The above information disclosed in this Background section is only for enhancing the understanding of the background of the invention and, therefore, it may contain information that is not prior art already known in this country to a person of ordinary skill in the art.

SUMMARY

An aspect of the present invention is to provide a rechargeable battery with improved safety.

An exemplary embodiment of the present invention provides a rechargeable battery, including: an electrode assembly including a first electrode and a second electrode; a case accommodating the electrode assembly; a first current collector coupled to the first electrode and including a fuse; and a second current collector coupled to the second electrode. First and second blocking members include a nonconductor and are spaced from each other with the fuse interposed therebetween.

The first and second blocking members may enclose the first current collector, and the first and second blocking members may include a heat-resistant polymer.

The first current collector may include an upper plate, a side plate extending at an angle from the upper plate toward the electrode assembly, and current collecting pieces extending from the side plate and coupled to the second electrode.

The upper plate may include a fuse and a fuse hole may be located at a center of the fuse. Alternatively, and the upper plate may include the fuse and cutouts may be located at opposite lateral ends of the fuse.

The first collector may include a declining portion between the upper plate and the side plate that is downwardly inclined with respect to the upper plate, and the declining portion may include the fuse. The first and second blocking members may be spaced from each other and with the declining portion interposed therebetween.

An upper part of the second blocking member may be formed thicker than an upper part of the first blocking member, and the first and second blocking members may include a polyimide.

The case may be electrically coupled to the first electrode, a cap plate may be positioned at an opening to the case, and the cap plate may include a short-circuit member that is configured to be deformed by increased internal pressure of the rechargeable battery and, when deformed, the short-circuit member electrically couples the first and second electrodes.

The first electrode may include a first electrode uncoated region where an active material is not coated, the second electrode may include a second electrode uncoated region where an active material is not coated, and the first and second electrode uncoated regions may protrude in the same direction and may be separated from each other.

The electrode assembly may be wound based on a winding axis and may be positioned in the case in a direction parallel to the winding axis. The first current collector may include an upper plate and an electrode attachment portion extending at an angle from the upper plate and directly bonded to the first electrode uncoated region.

According to exemplary embodiments of the present invention, because of the blocking members, an arc generated when the fuse is melted may be prevented or substantially prevented from expanding.

DETAILED DESCRIPTION

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

In addition, like reference numerals designate like elements throughout the specification and the drawings. Also, when a first element is described as being "coupled to" or "connected to" a second element, the first element may be directly "coupled to" or "connected to" the second element or indirectly "coupled to" or "connected to" the second element with one or more intervening elements interposed therebetween.

Figure 1:
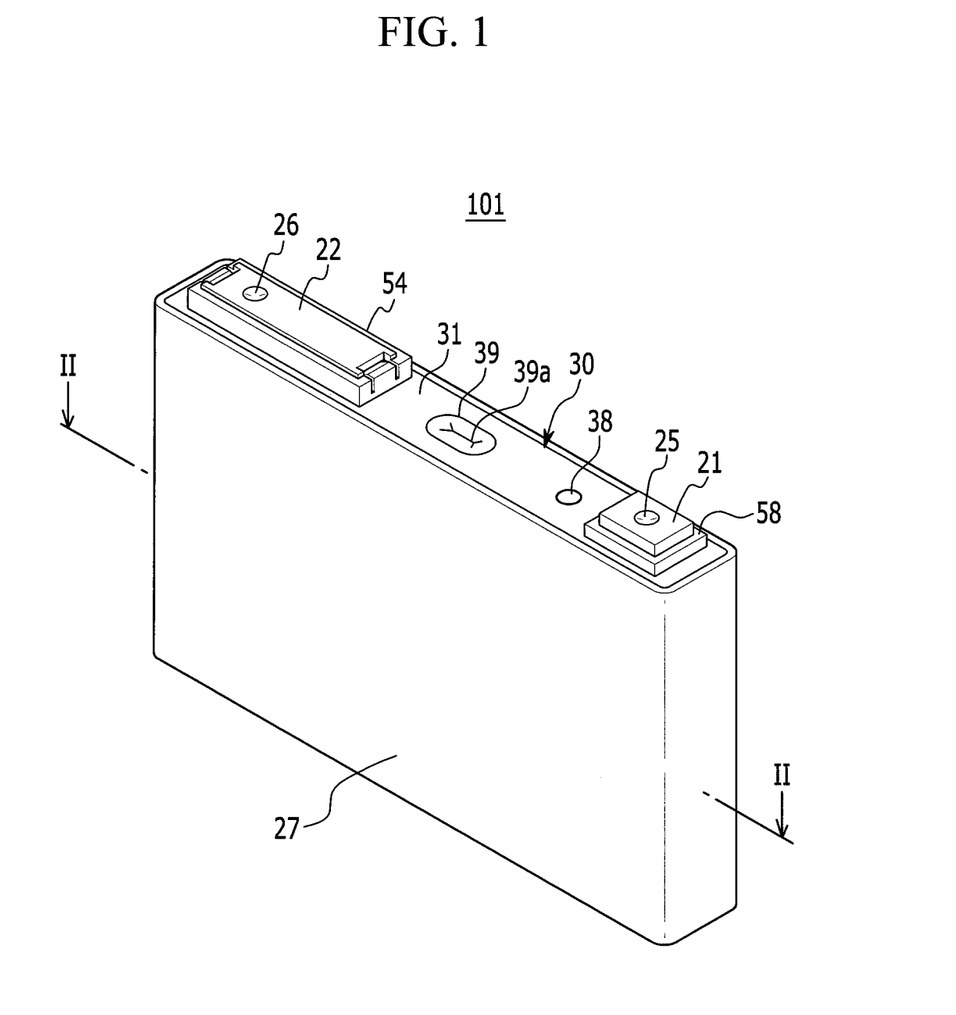
FIG. 1 is a perspective view of a rechargeable battery according to a first exemplary embodiment of the present invention.
Figure 2:
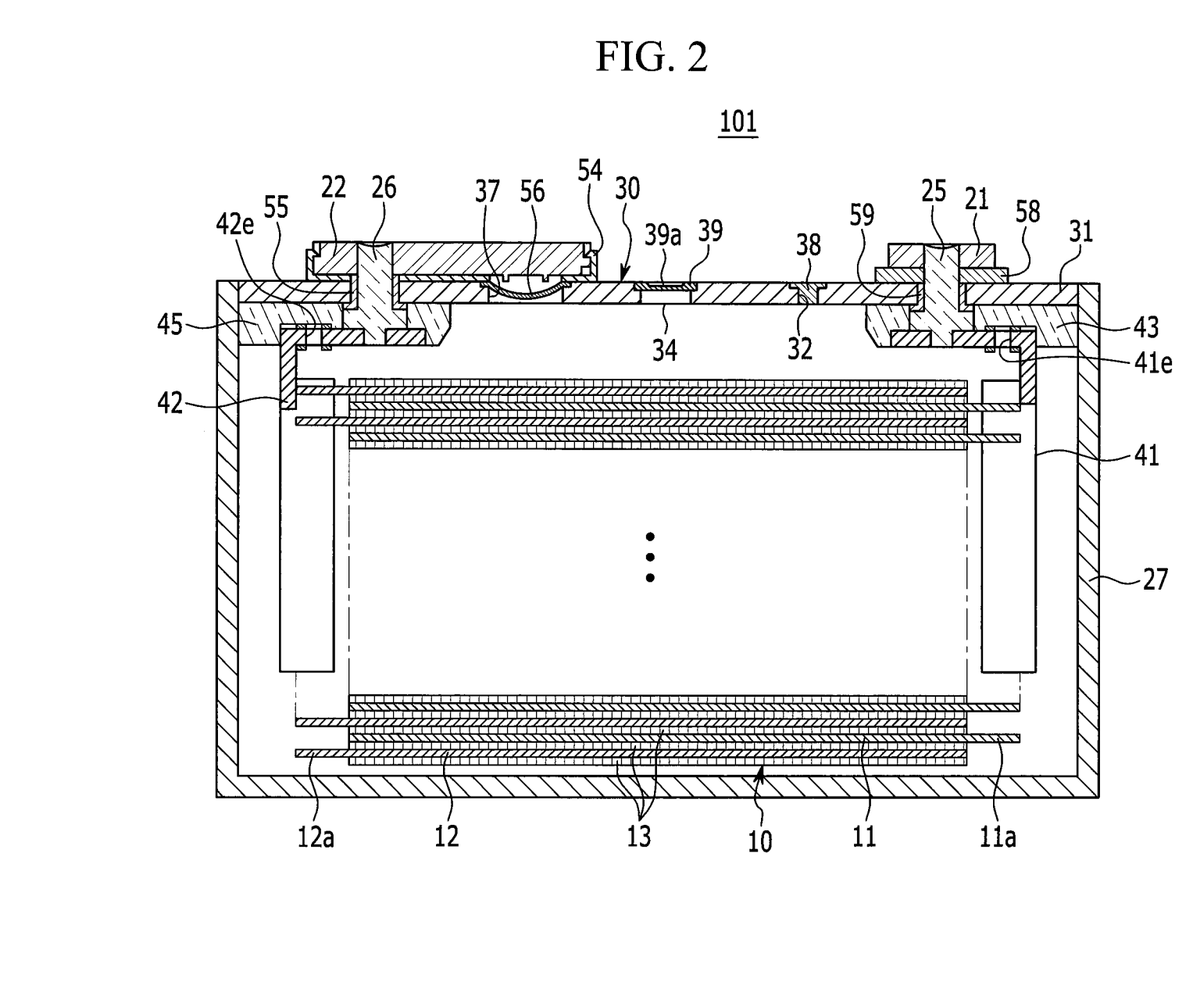
FIG. 2 is a cross-sectional view of FIG. 1 taken along the line II-II.

FIG. 1 is a perspective view of a rechargeable battery according to a first exemplary embodiment of the present invention, and FIG. 2 is a cross-sectional view of FIG. 1 taken along the line II-II.

Referring to FIGS. 1 and 2, the rechargeable battery 101 according to the first exemplary embodiment includes an electrode assembly 10 formed by winding a positive electrode (a first electrode) 11 and a negative electrode (a second electrode) 12 with a separator 13 interposed therebetween, a case 27 for accommodating the electrode assembly 10, and a cap assembly 30 positioned at and closing an opening of the case 27.

The rechargeable battery 101 according to the present exemplary embodiment is exemplarily illustrated as a prism-shaped lithium ion rechargeable battery.

However, the present invention is not limited thereto, and it may be applied to one or more of various suitable types of batteries such as a lithium polymer battery, a cylindrical battery, etc.

The positive electrode 11 and the negative electrode 12 each include coated regions where an active material is coated on a current collector formed of a thin metal foil, and uncoated regions 11a and 12a where the active material is not coated thereon.

The positive electrode uncoated region 11a is formed at one lateral end of the positive electrode 11 along a length direction thereof, and the negative electrode uncoated region 12a is formed at the other lateral end of the negative electrode 12 along a length direction thereof.

The positive electrode 11 and the negative electrode 12 are wound with the separator 13 interposed therebetween, which acts as an insulator therebetween.

However, the present invention is not limited thereto, and the electrode assembly 10 may be formed in a layered structure in which the negative electrode 12 and the positive electrode 11, respectively formed of a plurality of sheets, are layered with the separator 13 interposed therebetween.

The case 27 is formed to be substantially cuboid in shape, and one side thereof has an opening.

The case 27 may be formed of a metal such as aluminum, stainless steel, etc.

The cap assembly 30 includes a cap plate 31 that covers the opening of the case 27, a first terminal 21 electrically coupled to the positive electrode 11 and protruding out of the cap plate 31, and a second terminal 22 electrically coupled to the negative electrode 12 and also protruding out of the cap plate 31.

The cap plate 31 is formed as an elongated plate in one direction, and is positioned at (or combined to) the opening of the case 27.

The cap plate 31 is provided with a sealing cap 38 that is inserted in an electrolyte injection opening 32, and a vent plate 39 that is formed with a notch 39a that is provided in a vent hole (e.g., vent opening) 34 to be opened at a certain pressure (e.g., a predetermined pressure).

The first and second terminals 21 and 22 are installed to protrude above the cap plate 31.

The first terminal 21 is electrically coupled to the positive electrode 11 through a first current collector 41, and the second terminal 22 is electrically coupled to the negative electrode 12 through a second current collector 42.

However, the present invention is not limited thereto, and the first terminal 21 may be electrically coupled to the negative electrode, while the second terminal 22 may be electrically coupled to the positive electrode.

The first terminal 21 has a rectangular plate shape.

The first terminal 21 is electrically coupled to the positive electrode 11 through a connection terminal 25 that is bonded to the first current collector 41.

The connection terminal 25 has a pillar shape, and an upper end of the connection terminal 25 is fixed to the first terminal 21 by welding while being inserted into the first terminal 21.

Further, a lower end of the connection terminal 25 is fixed to the first current collector 41 by welding, and the first current collector 41 electrically couples the connection terminal 25 and the first electrode 11.

A sealing gasket 59 for sealing is provided between the first terminal 21 and the cap plate 31 by being inserted into a hole through which the connection terminal 25 extends, and a lower insulating member 43 is provided under the cap plate 31 to support the first current collector 41.

A connection member 58 is provided under the first terminal 21 to electrically couple the first terminal 21 and the cap plate 31.

Accordingly, the cap plate 31 and the case 27 are positively charged.

The second terminal 22 has a rectangular plate shape.

The second terminal 22 is electrically coupled to the negative electrode 12 through a connection terminal 26 that is bonded to the second current collector 42.

The connection terminal 26 penetrates through the cap plate 31 and the second terminal 22 such that its upper portion is fixed to the second terminal 22.

The connection terminal 26 has a pillar shape, and an upper end of the connection terminal 26 is fixed to the second terminal 22 by welding while being inserted into the second terminal 22.

Further, a lower end of the connection terminal 26 is fixed to the second current collector 42 by welding, and the second current collector 42 electrically couples the connection terminal 26 and the second electrode 12.

A sealing gasket 55 for sealing is installed between the second terminal 22 and the cap plate 31 by being inserted into a hole through which the connection terminal 25 extends, and a lower insulating member (i.e., lower insulation) 45 is installed under the cap plate 31 to insulate the second terminal 22 from the second current collector 42 at the cap plate 31.

In addition, a short-circuit protrusion is formed at a bottom of the second terminal 22 to protrude toward a short-circuit hole 37.

The second terminal 22 is formed such that it is elongated in one direction to cover the short-circuit hole 37.

An upper insulating member 54 is installed between the second terminal 22 and the cap plate 31 to electrically insulate the second terminal 22 from the cap plate 31.

Since the cap assembly 30 includes a short-circuit member 56 for short-circuiting the positive electrode 11 with the negative electrode 12, the short-circuit member 56 is electrically coupled to the cap plate 31 and is deformed to be connected to the second terminal 22 when the internal pressure of the rechargeable battery 101 increases.

The short-circuit hole (i.e., short-circuit opening) 37 is formed in the cap plate 31, and the short-circuit member 56 is disposed between the upper insulating member 54 and the cap plate 31 in the short-circuit hole 37.

In addition, the second terminal 22 is disposed to cover the short-circuit hole 37 thereon.

The short-circuit member 56 includes a curved portion that is downwardly convex in an arc shape, and an edge portion that is formed at outer portions of the curved portion to be fixed to the cap plate 31.

When gas is generated due to an abnormal reaction in the rechargeable battery, the internal pressure of the rechargeable battery increases.

When the internal pressure of the rechargeable battery 101 exceeds a certain pressure (e.g., a predetermined pressure), the curved portion is deformed to be upwardly convex, and in this case, the short-circuit protrusion and the short-circuit member 56 contact each other, causing a short-circuit.

Figure 3:
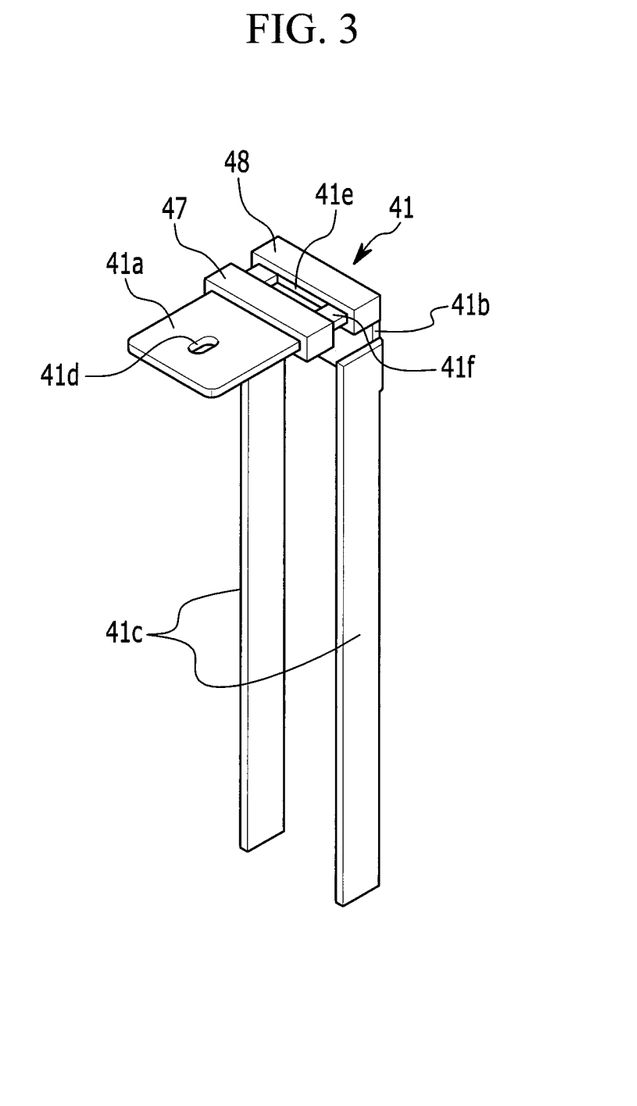
FIG. 3 is a perspective view of a first current collector of the rechargeable battery according to the first exemplary embodiment of the present invention.
Figure 4:
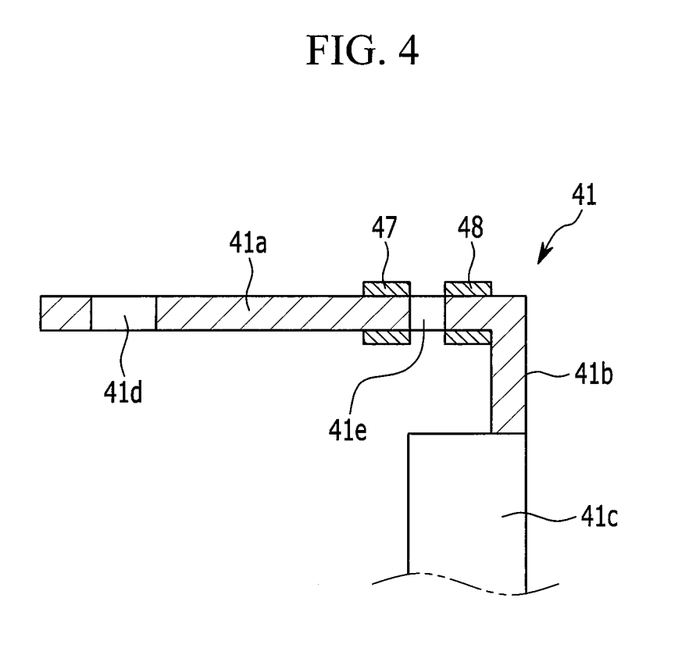
FIG. 4 is a partial vertical cross-sectional view of the first current collector according to the first exemplary embodiment of the present invention.

FIG. 3 is a perspective view of the first current collector of the rechargeable battery according to the first exemplary embodiment of the present invention, and FIG. 4 is a partial vertical cross-sectional view of the first current collector according to the first exemplary embodiment of the present invention.

The first current collector 41 will be described with reference to FIGS. 3 and 4.

Since the second current collector 42 has the same or substantially the same structure as the first current collector 41, the description of the first current collector 41 will also substantially apply to the second current collector 42.

The first current collector 41 includes an upper plate 41a that is bonded to the connection terminal 25, a side plate 41b that is bent from the upper plate 41a to downwardly extend toward the electrode assembly 10, and two current collecting pieces 41c that extend from the side plate 41b to be bonded to the electrode assembly 10.

The upper plate 41a has a quadrangular plate shape and is fixed to a lower part of the connection terminal 25 by welding.

A coupling hole (i.e., coupling opening) 41d is formed in the upper plate 41a, and the connection terminal 25 and the upper plate 41a are welded while a protrusion formed in the lower part of the connection terminal 25 is fitted into the coupling hole 41d.

The side plate 41b is formed to be downwardly bent toward a bottom of the case 27 from one end portion of the upper plate 41a.

The two current collecting pieces 41c are formed to be bent from opposite lateral ends of the side plate 41b, and are bonded to the positive electrode 11 by welding while being disposed in parallel with the uncoated region of the positive electrode 11.

Accordingly, the current collecting pieces 41c become an electrode bonding portion that is electrically coupled to the positive electrode 11.

Two electrode assemblies 10 are disposed in the case 27, and the current collecting pieces 41c are respectively bonded to the positive electrode uncoated regions 11a of the electrode assemblies 10.

A fuse 41f is formed in the upper plate 41a such that it has a smaller cross-sectional area than the portions of the first current collector 41 surrounding it.

The fuse 41f has a smaller vertical cross-sectional area than the portions surrounding it because a fuse hole 41e is formed in the fuse 41f.

The fuse hole 41e is disposed at a center of the fuse 41f, and the fuse 41f is formed at opposite lateral ends of the fuse hole 41e.

Further, a first blocking member 47 and a second blocking member 48 are installed at the first current collector 41, and the first and second blocking members 47 and 48 are separated from each other with the fuse 41f interposed therebetween.

The first blocking member 47 is adjacent to or contacts one end portion of the fuse 41f, and the second blocking member 48 is adjacent to or contacts the other end portion of the fuse 41f.

The first and second blocking members 47 and 48 enclose the upper plate 41a, and may be installed by being fixed to the first current collector 41 using an insert molding method.

The first blocking member 47 is installed between the connection terminal 25 and the fuse 41f, and the second blocking member 48 is disposed between the fuse 41f and the side plate 41b.

The first and second blocking members 47 and 48 are formed of a nonconductor and serve to prevent or substantially prevent arc generation.

The first and second blocking members 47 and 48 may be formed of a polyimide (PI), and in addition to the polyimide, may be formed of a heat resistive resin such as Teflon or the like.

Upper ends of the first and second blocking members 47 and 48 contact the lower insulating member 43.

The fuse 41f is not enclosed by the blocking members 47 and 48, but is exposed to the outside between the blocking members 47 and 48, thereby allowing it to be melted when exposed to overcurrent flows due to a short-circuit or the like.

When the fuse 41f is melted, an arc may be generated between separated parts.

The arc is generated between separated metal portions. The blocking members 47 and 48, which are formed of a nonconductor, may serve to prevent or substantially prevent the arc from expanding.

However, when the fuse 41f is enclosed by a blocking member, the arc is expanded between the blocking member and the fuse 41f and thus the arc is more rapidly expanded as compared to a fuse without such a blocking member.

However, when only a portion where the fuse 41f is formed is exposed, the first and second blocking members 47 and 48 may prevent or substantially prevent the arc from being expanded at the opposite lateral ends of the fuse 41f.

Figure 5:
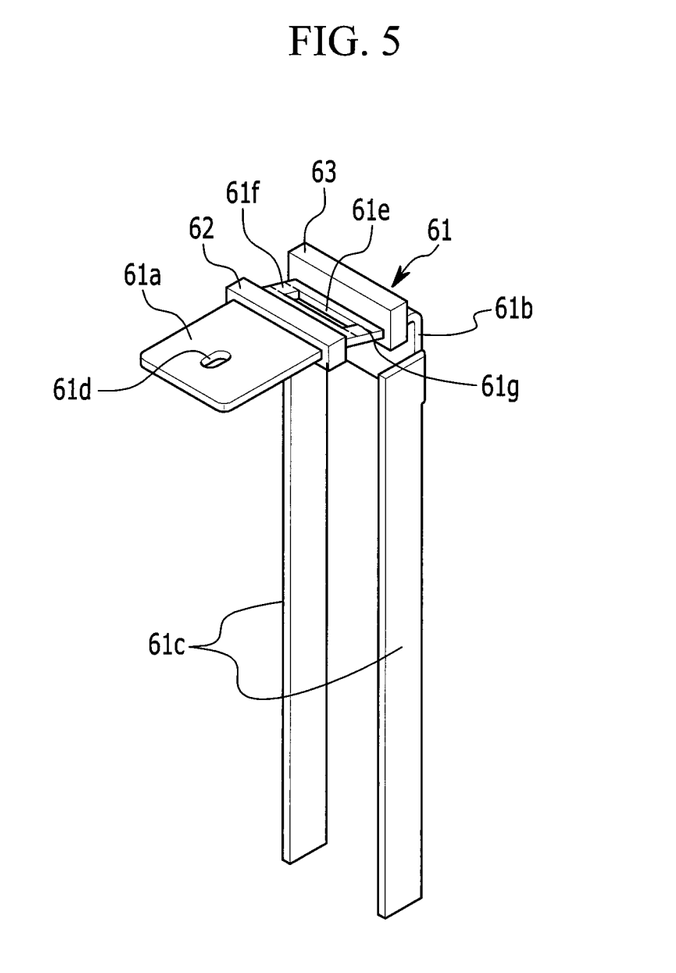
FIG. 5 is a perspective view of a first current collector of a rechargeable battery according to a second exemplary embodiment of the present invention.
Figure 6:
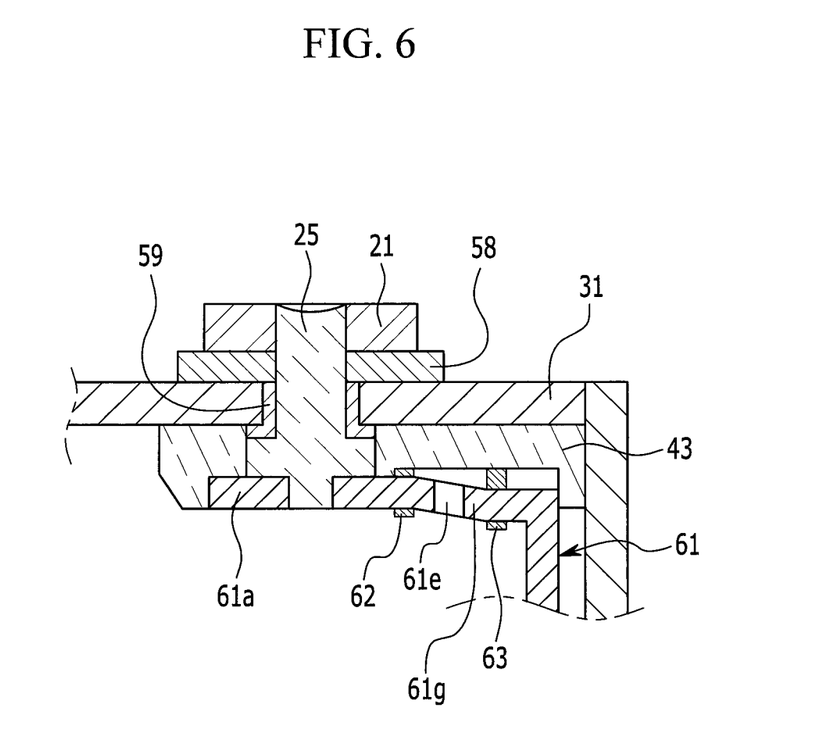
FIG. 6 is a partial vertical cross-sectional view of the rechargeable battery according to the second exemplary embodiment of the present invention.

FIG. 5 is a perspective view of a first current collector of a rechargeable battery according to a second exemplary embodiment of the present invention, and FIG. 6 is a partial vertical cross-sectional view of the rechargeable battery according to the second exemplary embodiment of the present invention.

Referring to FIGS. 5 and 6, a first current collector 61 according to the current second exemplary embodiment includes an upper plate 61a that is bonded to the connection terminal 25, a side plate 61b that is bent from the upper plate 61a to downwardly extend toward the electrode assembly 10, and two current collecting pieces 61c that extend from the side plate 61b to be bonded to the electrode assembly 10.

The upper plate 61a has a quadrangular plate shape and is fixed to the lower part of the connection terminal 25 by welding.

A coupling hole (i.e., coupling opening) 61d is formed in the upper plate 61a, and the connection terminal 25 and the upper plate 61a are welded while the protrusion formed in the lower part of the connection terminal 25 is inserted into the coupling hole 61d.

In addition, a declining portion 61g is formed between the upper plate 61a and the side plate 61b such that it connects the upper plate 61a with the side plate 61b and is slanted at an incline with respect to the upper plate 61a.

The side plate 61b is formed to be downwardly bent toward the bottom of the case 27 from one end portion of the upper plate 61a.

The two current collecting pieces 61c are formed to be bent from opposite lateral ends of the side plate 61b, and are bonded to the positive electrode 11 by welding while being disposed in parallel with the uncoated region of the positive electrode 11.

Accordingly, the current collecting pieces 61c become an electrode bonding portion that is electrically coupled to the positive electrode 11.

Two electrode assemblies 10 are disposed in the case 27, and the current collecting pieces 61c are respectively bonded to the positive electrode uncoated regions 11a of the electrode assemblies 10.

A fuse 61f is formed in the declining portion (e.g., slanted portion) 61g and it has a smaller cross-sectional area than portions of the first current collector 61 surrounding it.

The fuse 61f has a smaller vertical cross-sectional area than the portions surrounding it because a fuse hole 61e is formed in the fuse 61f.

The fuse hole 61e is disposed at a center of the fuse 61f, and the fuse 61f is formed at opposite lateral ends of the fuse hole 61e.

In addition, a first blocking member 62 and a second blocking member 63 are installed at the first current collector 61, and the first and second blocking members 62 and 63 are separated from each other with the fuse 61f interposed therebetween.

For example, in the present exemplary embodiment, the first and second blocking members 62 and 63 are separated from each other with the declining portion 61g interposed therebetween, and the first blocking member 62 contacts one end portion of the declining portion 61g while the second blocking member 63 is disposed to contact the other end portion of the declining portion 61g.

Accordingly, the first blocking member 62 is above a center of the declining portion 61g, while the second blocking member 63 is below the center of the declining portion 61g.

The first and second blocking members 62 and 63 enclose the upper plate 61a, and may be installed by being fixed to the first current collector 61 using an insert molding method.

The first blocking member 62 is between the connection terminal 25 and the fuse 61f, and the second blocking member 63 is between the fuse 61f and the side plate 61b.

The first and second blocking members 62 and 63 are formed of a nonconductor and serve to prevent or substantially prevent arc generation.

The first and second blocking members 62 and 63 may be formed of a polyimide (PI), and in addition to the polyimide, may be formed of a heat resistive resin such as Teflon or the like.

Upper ends of the first and second blocking members 62 and 63 contact the lower insulating member 43.

For this purpose, an upper part of the second blocking member 63 is formed thicker than that of the first blocking member 62, and the first and second blocking members 62 and 63 are supported by the lower insulating member 43, thereby maintaining structural stability therebetween.

The fuse 61f is not enclosed by the blocking members but is exposed to the outside between the blocking members 62 and 63, thereby allowing it to be melted when exposed to overcurrent flows due to a short-circuit or the like.

When the fuse 61f is melted, an arc may be generated between separated parts.

The arc is generated between separated metal portions. The blocking members 62 and 63, which are formed of a nonconductor, may serve to prevent or substantially prevent the arc from being expanded.

When the declining portion 61g is formed as in the current exemplary embodiment, occurrence or expansion of the arc may be further decreased because the separated portions are further spaced apart from each other in a height direction.

Figure 7:
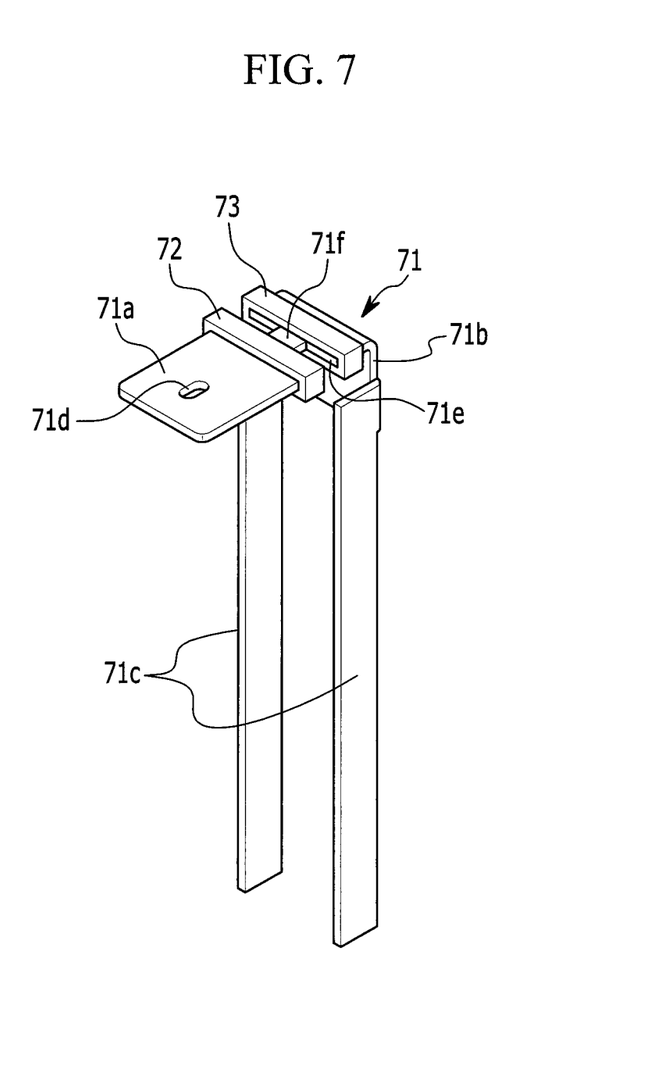
FIG. 7 is a perspective view of a first current collector according to a third exemplary embodiment of the present invention.

FIG. 7 is a perspective view of a first current collector according to a third exemplary embodiment of the present invention.

Referring to FIG. 7, a first current collector 71 includes an upper plate 71a that is bonded to the connection terminal 25, a side plate 71b that is bent from the upper plate 71a to downwardly extend toward the electrode assembly 10, and two current collecting pieces 71c that extend from the side plate 71b to be bonded to the electrode assembly 10.

The upper plate 71a has a quadrangular plate shape and is fixed to the lower part of the connection terminal 25 by welding.

A coupling hole (i.e., coupling opening) 71d is formed in the upper plate 71a, and the connection terminal 25 and the upper plate 71a are welded while the protrusion formed in the lower part of the connection terminal 25 is inserted into the coupling hole 71d.

The side plate 71b is formed to be downwardly bent toward the bottom of the case 27 from one end portion of the upper plate 71a.

The two current collecting pieces 71c are formed to be bent from opposite lateral ends of the side plate 71b, and are bonded to the positive electrode 11 by welding while being disposed in parallel with the uncoated region of the positive electrode 11.

Accordingly, the current collecting pieces 71c become an electrode bonding portion that is electrically coupled to the positive electrode 11.

Two electrode assemblies 10 are disposed in the case 27, and the current collecting pieces 71c are respectively bonded to the positive electrode uncoated regions 11a of the electrode assemblies 10.

A fuse 71f is formed in the upper plate 71a such that it has a smaller cross-sectional area than the portions of the first current collector 71 surrounding it.

The fuse 71f has a smaller vertical cross-sectional area than the portions surrounding it because cutouts 71e are formed at opposite lateral ends of the fuse 71f.

The cutouts 71e are formed to contact the opposite lateral ends of the fuse 71f, and the fuse 71f is disposed between the cutouts 71e.

In addition, a first blocking member 72 and a second blocking member 73 are installed at the first current collector 71, and the first and second blocking members 72 and 73 are separated from each other with the fuse 71f interposed therebetween.

The first blocking member 72 is adjacent to or contacts one end portion of the fuse 71f, and the second blocking member 73 is adjacent to or contacts the other end portion of the fuse 71f.

The first and second blocking members 72 and 73 enclose the upper plate 71a, and may be installed by being fixed to the first current collector 71 using an insert molding method.

The first blocking member 72 is between the connection terminal 25 and the fuse 71f, and the second blocking member 73 is between the fuse 71f and the side plate 71b.

The first blocking member 72 and the second blocking member 73 are formed of a nonconductor and serve to prevent or substantially prevent arc generation.

The first and second blocking members 72 and 73 may be formed of a polyimide (PI), and in addition to the polyimide, may be formed of a heat resistive resin such as Teflon or the like.

Upper ends of the first and second blocking members 72 and 73 contact the lower insulating member 43.

The fuse 71f is not enclosed by the blocking members 72 and 73, but is exposed to the outside between the blocking members 72 and 73, thereby allowing it to be melted when exposed to overcurrent flows due to a short-circuit or the like.

When the fuse 71f is melted, an arc may be generated between separated parts.

The arc is generated between separated metal portions. The blocking members 72 and 73, which are formed of a nonconductor, may serve to prevent or substantially prevent the arc from being expanded.

Figure 8:
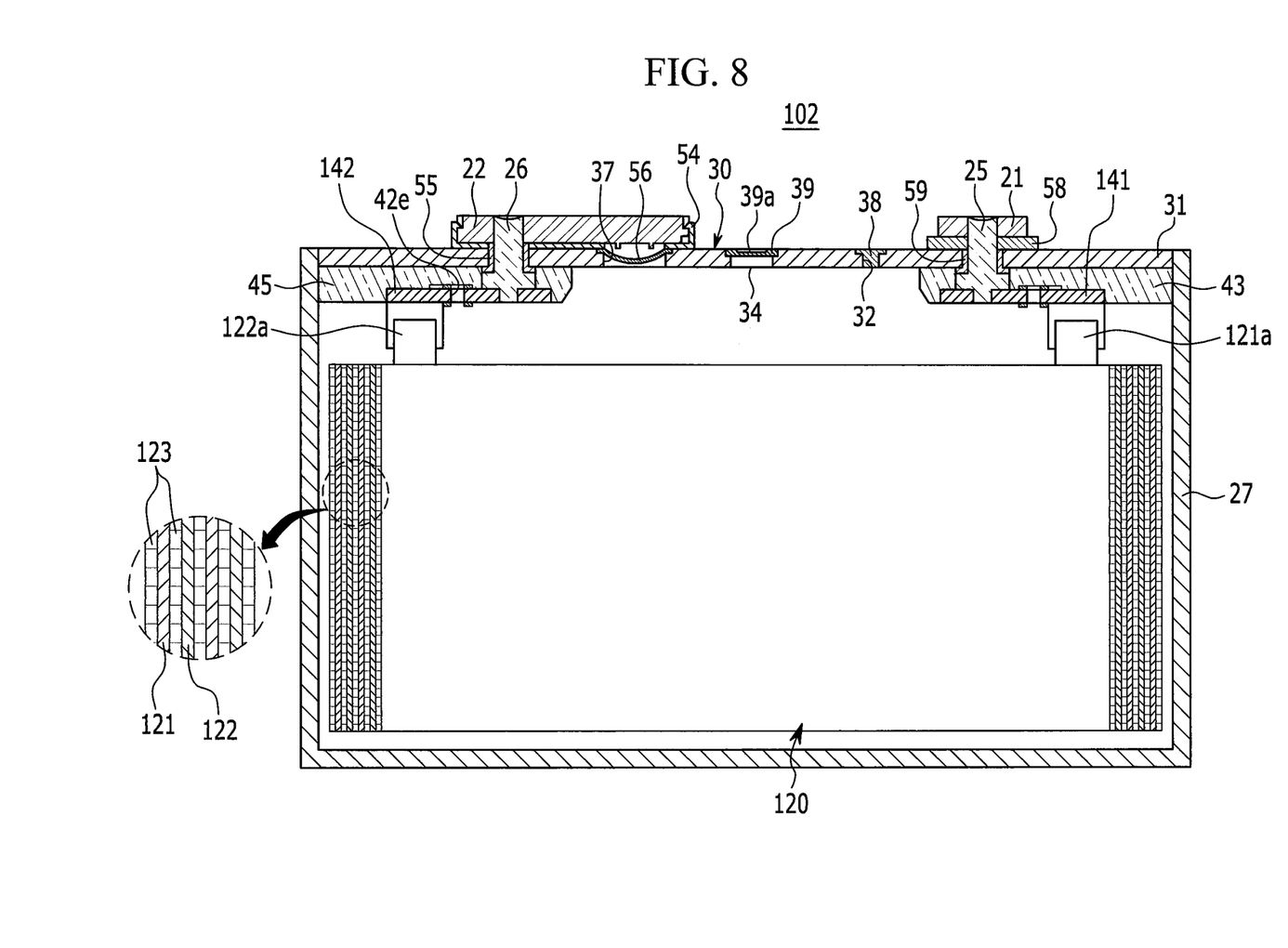
FIG. 8 is a vertical cross-sectional view of a rechargeable battery according to a fourth exemplary embodiment of the present invention.
Figure 9:
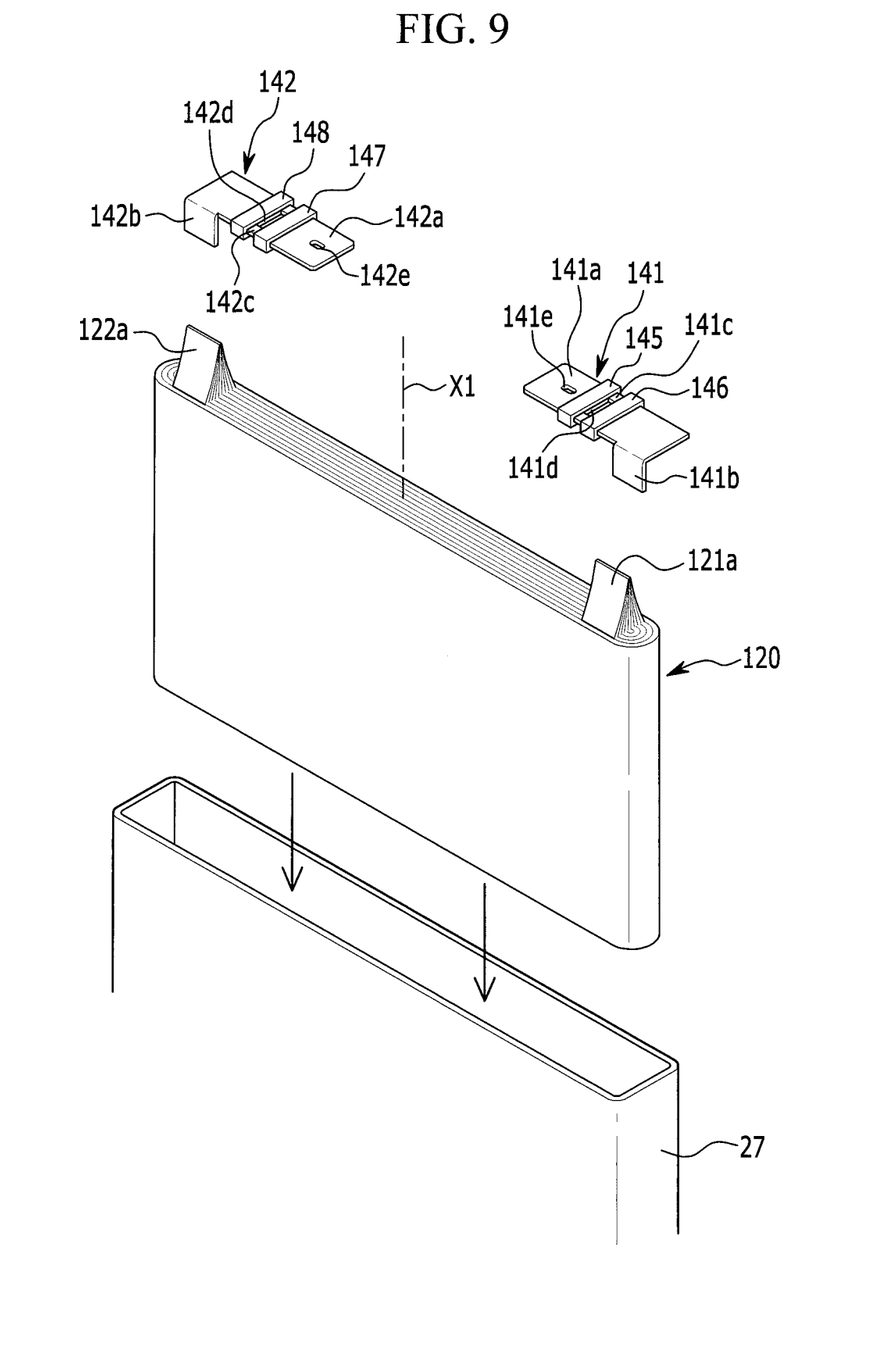
FIG. 9 is a partial exploded perspective view of the rechargeable battery according to the fourth exemplary embodiment of the present invention.

FIG. 8 is a vertical cross-sectional view of a rechargeable battery according to a fourth exemplary embodiment of the present invention, and FIG. 9 is a partial exploded perspective view of the rechargeable battery according to the fourth exemplary embodiment of the present invention.

Referring to FIGS. 8 and 9, the rechargeable battery according to the current fourth exemplary embodiment includes a case, an electrode assembly inserted into the case, and first and second current collectors electrically coupling terminals to the electrode assembly.

Since the rechargeable battery 102 according to the current fourth exemplary embodiment has the same structure as the rechargeable battery according to the aforementioned first exemplary embodiment, except for an electrode assembly and current collectors, a repeated description of the same structures may be omitted.

After the electrode assembly 120 is formed by interposing a separator 123 between a positive electrode 121 and a negative electrode 122 and then winding them based on a winding axis X1, the electrode assembly 120 is flatly pressed.

The positive electrode 121 and the negative electrode 122 include coated regions where an active material is coated on a current collector formed of a thin metal foil, and uncoated regions 121a and 122a where the active material is not coated thereon.

The positive electrode uncoated region (first electrode uncoated region) 121a and the negative uncoated region (second electrode uncoated region) 122a are formed to protrude in the same direction toward the cap plate.

The electrode assembly 120 is inserted into the case 27 in a direction parallel to the winding axis X1 such that the positive electrode uncoated region 121a and the negative electrode uncoated region 122a upwardly protrude from an upper end of the electrode assembly 120.

In addition, the positive and negative electrode uncoated regions 121a and 122a are disposed to be separated from each other by a distance therebetween.

The positive electrode uncoated region 121a is disposed to be adjacent to one lateral end of the electrode assembly 120, while the negative electrode uncoated region 122a is adjacent to the other lateral end of the electrode assembly 120.

A first current collector 141 includes an upper plate 141a that is bonded to the connection terminal 25, and an electrode attachment portion 141b that is bent toward the electrode assembly 120 from the upper plate 141a to be bonded to the positive electrode uncoated region 121a.

The electrode attachment portion 141b is bent from an end portion of the upper plate 141a in a width direction thereof such that it is parallel to the electrode assembly 120.

The upper plate 141a has a quadrangular plate shape and is fixed to the lower part of the connection terminal 25 by welding.

A coupling hole (i.e., coupling opening) 141e is formed in the upper plate 141a, and the connection terminal 25 and the upper plate 141a are welded while the protrusion formed in the lower part of the connection terminal 25 is inserted into the coupling hole 141e.

A fuse 141c is formed in the upper plate 141a such that it has a smaller cross-sectional area than portions of the first current collector 141 surrounding it.

The fuse 141c has a smaller vertical cross-sectional area than the portions surrounding it because a fuse hole (i.e., fuse opening) 141d is formed in the fuse 141c.

The fuse hole 141d is disposed at a center of the fuse 141c, and the fuse 141d is formed at opposite lateral ends of the fuse hole 141d.

In addition, a first blocking member 145 and a second blocking member 146 are installed at the first current collector 141, and the first and second blocking members 145 and 146 are separated from each other with the fuse 141c interposed therebetween.

The first and second blocking members 145 and 146 enclose the upper plate 141a, and may be installed by being fixed to the first current collector 141 using an insert molding method.

The first blocking member 142 is between the connection terminal 25 and the fuse 141c, and the second blocking member 63 is between the fuse 141c and the electrode attachment portion 141b.

The first and second blocking members 145 and 146 are formed of a nonconductor and serve to prevent or substantially prevent arc generation.

The first and second blocking members 145 and 146 may be formed of a polyimide (PI), and in addition to the polyimide, may be formed of a heat resistive resin such as Teflon or the like.

Upper ends of the first and second blocking members 145 and 146 contact the lower insulating member 43.

When the fuse 141c is melted, an arc may be generated between separated parts.

The arc is generated between separated metal portions. The blocking members 145 and 146, which are formed of a nonconductor, may serve to prevent or substantially prevent the arc from being expanded.

A second current collector 142 includes an upper plate 142a that is bonded to the connection terminal 26, and an electrode attachment portion 142b that is bent toward the electrode assembly 120 from the upper plate 142a to be directly bonded to the negative electrode uncoated region 122a.

The electrode attachment portion 142b is bent from an end portion of the upper plate 142a in a width direction thereof such that it is in parallel with the electrode assembly 120.

The upper plate 142a has a quadrangular plate shape, and is fixed to the lower part of the connection terminal 26 by welding.

A coupling hole (i.e., coupling opening) 142e is formed in the upper plate 142a, and the connection terminal 26 and the upper plate 142a are welded while the protrusion formed in the lower part of the connection terminal 26 is inserted into in the coupling hole 142e.

A fuse 142c is formed in the upper plate 142a such that it has a smaller cross-sectional area than portions of the second current cullecting member 142 surrounding it.

The fuse 142c has a smaller vertical cross-sectional area than the portions surrounding it because a fuse hole 142d is formed in the fuse 142c.

The fuse hole 142d is at a center of the fuse 142c, and the fuse 142c is formed at opposite lateral ends of the fuse hole 142d.

In addition, a first blocking member 147 and a second blocking member 148 are installed at the second current collector 142, and the first and second blocking members 147 and 148 are separated from each other with the fuse 142c interposed therebetween.

The first and second blocking members 147 and 148 enclose the upper plate 142a, and may be installed by being fixed to the second current collector 142 using an insert molding method.

The first blocking member 147 is between the connection terminal 26 and the fuse 142c, and the second blocking member 148 is between the fuse 142c and the electrode attachment portion 142b.

The first and second blocking members 147 and 148 are formed of a nonconductor and serve to prevent or substantially prevent arc generation.

The first and second blocking members 147 and 148 may be formed of a polyimide (PI), and in addition to the polyimide, may be formed of a heat resistive resin such as Teflon or the like.

Upper ends of the first and second blocking members 147 and 148 are disposed to contact the lower insulating member 43.

When the fuse 142c is melted, an arc may be generated between separated parts.

The arc may be generated between separated metal portions. The blocking member, which is formed of a nonconductor, may serve to prevent or substantially prevent the arc from being expanded.

While the present invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their respective equivalents.

| Description of Some References Characters | |
|---|---|
| 101: rechargeable battery | 10: electrode assembly |
| 11: positive electrode | 11a: positive electrode uncoated region |
| 12: negative electrode | 12a: negative uncoated region |
| 13: separator | 21: first terminal |

| Description of Some References Characters | |
|---|---|
| 22: second terminal | 25, 26: connection terminal |
| 27: case | 30: cap assembly |
| 31: cap plate | 41, 61, 71: first current collector |
| 42: second current collector | 41a, 61a, 71a: upper plate |
| 41b, 61b, 71b: side plate | 41c, 61c, 71c: current collecting piece |
| 41d, 61d, 71d: coupling hole | 41e, 61e, 71e: fuse hole |
| 41f, 61f, 71f: fuse | 43, 45: lower insulating member |
| 47, 62, 72: first blocking member | 48, 63, 73: second blocking member |
| 54: upper insulating member | 55: sealing gasket |
| 56: short-circuit member | 58: connection member |
| 59: sealing gasket | 61g: declining portion |

What is claimed is:

1. A rechargeable battery comprising:
   an electrode assembly comprising a first electrode and a second electrode;
   a case for accommodating the electrode assembly;
   a first current collector coupled to the first electrode and comprising a fuse; and
   a second current collector coupled to the second electrode, and
   a first blocking member and a second blocking member each comprising a heat resistant polymer and spaced from each other and with the fuse interposed therebetween,
   wherein the fuse is exposed to an outside of the first and second blocking members, the first current collector comprises an upper plate, and the fuse and first and second blocking members are resided at the upper plate; and
   wherein the first and second blocking members have inner surfaces that enclose surfaces of the upper plate, and the inner surfaces further contact and cover surfaces of the upper plate.

2. The rechargeable battery of claim 1, wherein the first current collector comprises a side plate extending at an angle from the upper plate toward the electrode assembly, and current collecting pieces extending from the side plate and bonded to the second electrode.

3. The rechargeable battery of claim 2, wherein the upper plate comprises the fuse and a fuse opening is located at a center of the fuse.

4. The rechargeable battery of claim 2, wherein the upper plate comprises the fuse and cutouts are located at opposite lateral ends of the fuse.

5. The rechargeable battery of claim 2, wherein the first current collector further comprises a declining portion between the upper plate and the side plate that is downwardly inclined with respect to the upper plate, and the declining portion comprises the fuse.

6. The rechargeable battery of claim 5, wherein the first and second blocking members are spaced from each other and with the declining portion interposed inbetween.

7. The rechargeable battery of claim 5, wherein an upper part of the second blocking member is thicker than an upper part of the first blocking member.

8. The rechargeable battery of claim 5, wherein the first and second blocking members comprise a polyimide.

9. The rechargeable battery of claim 1, wherein the case is electrically coupled to the first electrode.

10. The rechargeable battery of claim 9, wherein a cap plate is positioned at an opening of the case, and the cap plate comprises a short-circuit member that is configured to be deformed by increased internal pressure of the rechargeable battery and, when deformed, to electrically couple the first and second electrodes.

11. The rechargeable battery of claim 1, wherein the first electrode comprises a first electrode uncoated region wherein an active material is not coated, the second electrode comprises a second electrode uncoated region wherein an active material is not coated, and the first and second electrode uncoated regions protrude in the same direction and are separated from each other.

12. The rechargeable battery of claim 11, wherein the electrode assembly is wound with respect to a winding axis, and is positioned in the case in a direction parallel to the winding axis.

13. The rechargeable battery of claim 11, wherein the first current collector comprises the upper plate, and an electrode attachment portion extending at an angle from the upper plate and directly bonded to the first electrode uncoated region.

14. The rechargeable battery of claim 1, wherein the fuse comprises a vertical wall defining a fuse opening and wherein the first and the second blocking members contact an end of the vertical wall.

* * * * *